(12) United States Patent
Gulbahar et al.

(10) Patent No.: US 12,277,764 B2
(45) Date of Patent: Apr. 15, 2025

(54) METHOD, DEVICE, COMPUTER PROGRAM, AND COMPUTER PROGRAM PRODUCT FOR ANALYZING DATA SETS OF ACTION OBJECTS IN AUDIO AND/OR VISUAL MEDIA CONTENTS

(71) Applicant: Transfermedia Production Services GMBH, Potsdam (DE)

(72) Inventors: Mark F. Gulbahar, Landshut (DE); Claudia Wolf, Nuthetal (DE)

(73) Assignee: Transfermedia Production Services GMBH, Potsdam (DE)

( * ) Notice: Subject to any disclaimer, the term of this patent is extended or adjusted under 35 U.S.C. 154(b) by 0 days.

(21) Appl. No.: 18/680,867

(22) Filed: May 31, 2024

(65) Prior Publication Data
US 2024/0320974 A1    Sep. 26, 2024

Related U.S. Application Data

(63) Continuation of application No. PCT/IB2022/052388, filed on Mar. 16, 2022.

(51) Int. Cl.
*G06V 20/40* (2022.01)
(52) U.S. Cl.
CPC ................... *G06V 20/41* (2022.01)
(58) Field of Classification Search
CPC ...... G06V 20/20; G06V 30/142; G06V 10/56; G06V 10/7515; G06V 10/462; G06V 30/224; G06V 20/10; G06V 10/94; G06V 10/25; G06V 10/60; G06V 2201/03; G06V 10/70; G06V 20/00; G06V 2201/034; G06V 40/171; G06V 20/52; G06V 20/653; G06V 40/23; G06V 10/754; G06V 40/10; G06V 40/161; G06V 10/40; G06V 10/764; G06V 10/95; G06V 40/1365; G06V 40/16; G06V 20/58; G06V 20/693; G06V 20/698; G06V 10/145; G06V 10/772; G06V 10/811;
(Continued)

(56) References Cited

U.S. PATENT DOCUMENTS 9,912,711 B1 * 3/2018 Favale ................. H04L 65/612
11,423,252 B1 * 8/2022 Jagannathan .......... G06V 20/41
(Continued)

OTHER PUBLICATIONS

International Search Report and Written Opinion dated Oct. 27, 2022, issued in PCT Application No. PCT/IB2022/052388, filed Mar. 16, 2022.
(Continued)

*Primary Examiner* — Dhaval V Patel
(74) *Attorney, Agent, or Firm* — Workman Nydegger

(57) ABSTRACT

The aim of the invention is to analyze and evaluate a data set of action objects which arise in audio and/or visual media contents. The action objects are visual and/or audible objects or elements in an audio and/or visual media content which can be perceived by a viewer and/or listener and are not physical characteristics of the digital data of a video file or an audio file. Another aim of the invention is to analyze and evaluate the action objects described in the data set by means of parameters and parameter values according to the significance of the parameters and parameter values and the quality of the data set with respect to the action objects and to make the same measurable.

15 Claims, 5 Drawing Sheets

(58) Field of Classification Search
CPC ........ G06V 10/82; G06V 20/62; G06V 20/64; G06V 2201/033; G06V 30/418; G06V 40/103; G06V 40/1318; G06V 40/172; G06V 40/20; G06V 10/751; G06V 10/761; G06V 10/762; G06V 10/803; G06V 20/56; G06V 2201/07; G06V 40/168; G06V 10/147; G06V 10/245; G06V 10/273; G06V 10/28; G06V 10/30; G06V 10/42; G06V 10/426; G06V 10/431; G06V 10/443; G06V 10/454; G06V 10/46; G06V 10/50; G06V 10/7557; G06V 10/757; G06V 10/759; G06V 20/17; G06V 20/176; G06V 20/42; G06V 20/46; G06V 20/635; G06V 20/647; G06V 20/69; G06V 20/80; G06V 2201/06; G06V 2201/09; G06V 2201/121; G06V 30/10; G06V 30/19; G06V 30/194; G06V 30/40; G06V 40/13; G06V 40/1347; G06V 40/1353; G06V 40/1388; G06V 40/1394; G06V 40/165; G06V 40/40; G06V 40/45; G06V 40/50; G06V 40/70; G06V 10/457; G06V 10/945; G06V 20/13; G06V 20/188; G06V 20/194; G06V 20/588; G06V 20/66; G06V 2201/05; G06V 30/412; G06V 30/422; G06V 40/173; G06T 7/11; G06T 7/13; G06T 7/33; G06T 7/73; G06T 7/10; G06T 7/337; G06T 7/136; G06T 7/194; G06T 7/246; G06T 2207/10024; G06T 19/006; G06T 2207/10148; G06T 2207/10152; G06T 2207/30041; G06T 7/0012; G06T 2207/30008; G06T 7/62; G06T 2207/10016; G06T 7/70; G06T 7/90; G06T 7/001; G06T 2207/10028; G06T 2207/10048; G06T 2207/10116; G06T 11/60; G06T 2200/24; G06T 2207/30004; G06T 2207/30148; G06T 7/0014; G06T 11/00; G06T 11/001; G06T 2207/30096; G06T 2207/30204; G06T 7/80; G06T 11/203; G06T 2207/30088; G06T 2210/41; G06T 15/205; G06T 2207/20212; G06T 2207/30244; G06T 7/0016; G06T 7/50; G06T 7/20; G06T 2207/20104; G06T 19/20; G06T 5/00; G06T 17/20; G06T 2200/04; G06T 2207/10088; G06T 7/41; G06T 13/40; G06T 17/10; G06T 2207/10081; G06T 7/0004; G06T 7/0006; G06T 15/08; G06T 17/205; G06T 2200/08; G06T 2207/20081; G06T 17/00; G06T 2207/20076; G06T 2207/30164; G06T 2207/20084; G06T 7/0008; G06T 7/74; G06T 2207/20221; G06T 2207/30201; G06T 9/00; G06T 2207/20021; G06T 2207/30196; G06T 2207/30232; G06T 5/70; G06T 7/0002; G06T 7/292; G06T 7/60; G06T 7/66; G06T 7/75; G06T 19/00; G06T 2207/10072; G06T 2207/10132; G06T 2207/30128; G06T 2207/30141; G06T 2207/30168; G06T 2207/30184; G06T 2207/30268; G06T 7/251; G06T 2200/32; G06T 2207/10032; G06T 2207/10036; G06T 2207/10061; G06T 2207/20072; G06T 2207/30012; G06T 2207/30024; G06T 2207/30068; G06T 2207/30241; G06T 2207/30252; G06T 2210/12; G06T 2219/2016; G06T 2219/2021; G06T 3/02; G06T 3/4053; G06T 5/10; G06T 5/40; G06T 5/50; G06T 5/60; G06T 5/80; G06T 7/12; G06T 7/149; G06T 7/30; G06T 7/49; G06T 11/206; G06T 15/04; G06T 2207/10004; G06T 2207/10044; G06T 2207/10056; G06T 2207/10064; G06T 2207/20061; G06T 2207/20092; G06T 2207/30101; G06T 2207/30112; G06T 2207/30236; G06T 2207/30242; G06T 2207/30248; G06T 2219/2004; G06T 2219/2012; G06T 3/00; G06T 3/40; G06T 7/168; G06T 7/521; G06T 9/007; G06T 9/20; G06K 19/06028; G06K 19/06037; G06K 19/06112; G06K 7/0008; G06K 7/10297; G06K 7/1413

See application file for complete search history.

(56) References Cited

U.S. PATENT DOCUMENTS

| 11,430,039 | B1* | 8/2022 | Pham ................ G06Q 30/0609 |
| 2013/0117262 | A1 | 5/2013 | Lenahan et al. |
| 2015/0193468 | A1* | 7/2015 | Singh ...................... G06F 16/29 |
| | | | 707/724 |
| 2022/0250054 | A1* | 8/2022 | Wade ................ B01L 3/502738 |
| 2022/0262105 | A1* | 8/2022 | Zhou ...................... G06N 3/088 |

OTHER PUBLICATIONS

Florian Vandecasteele et al., *Spatio-Temporal Wardrobe Generation of Actors' Clothing in Video Content*, ARXIV.org, Cornel University Library, 201 OLIN Library Cornell University, Ithaca, NY 14853, Jun. 19, 2016, pp. 448-459, XP047555699.

* cited by examiner

METHOD, DEVICE, COMPUTER PROGRAM, AND COMPUTER PROGRAM PRODUCT FOR ANALYZING DATA SETS OF ACTION OBJECTS IN AUDIO AND/OR VISUAL MEDIA CONTENTS

CROSS-REFERENCE TO RELATED APPLICATIONS

This application is a continuation of PCT Application No. PCT/IB2022/052388, filed Mar. 16, 2022, which is incorporated herein in its entirety by specific reference.

BACKGROUND OF THE INVENTION

1. The Field of the Invention

The present invention relates to a method, a device, a computer program and a computer program product for analyzing and evaluating data sets of action objects in an audio and/or visual media content.

2. The Relevant Technology

It is known that metadata is used as additional information to describe audio and/or visual media content and specifies technical and descriptive properties of an audio and/or visual media content. Examples of metadata include author, creation date, recording location, camera information, upload date, image resolution, refresh rate, aperture, focal length, artist name, music style and sample rate.

SUMMARY OF THE INVENTION

The invention is based on the object of analyzing and evaluating the data set of action objects that appear in an audio and/or visual media content. The action objects are visual and/or audible objects or Elements that can be perceived by a viewer and/or listener in an audio and/or visual media content and are not physical characteristics of the digital data of a video file or an audio file. Furthermore, the invention is based on the object of analyzing and evaluating the action objects described in the data set with the parameters and parameter values, depending on the significance of the parameters and parameter values, and making the quality of the data set in relation to the action objects measurable.

The present invention is described below according to the claims, listed embodiments and figures.

According to a first aspect of the present invention, a method is provided for analyzing a data set of parameters of action objects in an audio and/or visual media content, wherein the parameters of the data set describe the action objects in the audio and/or visual media content with corresponding parameter values and wherein each action object has at least one associated parameter with at least one parameter value and thus the method analyzes the parameters for existing parameter values in the dataset. The method according to the first aspect comprises in particular the following steps:

reading the data set,
  reading the existing parameter values,
  verifying a presence of parameter values of the parameters of at least one action object in the audio and/or visual media content,
  calculating a result based on the presence of parameter values of the parameters of at least one action object in the audio and/or visual media content.

The data set contains at least one action object, which is at least one product, one service, one athlete, one person and/or one team. Furthermore, according to the invention, each action object can be specified with corresponding parameters, so that the corresponding action object is described and specified depending on the importance or number of existing parameter values. Thus, the data set contains information about action objects occurring in the audio and/or visual media content, each of which may have parameter values for a precise description. Depending on its type and nature, an action object can have different parameters, each of which can accept parameter values according to the parameter type or parameter.

It should be noted that the action object is defined as an element of the audio and/or visual media content that is represented pictorially and/or acoustically and can be perceived by a viewer and/or listener. Thus, the object of action can be a product, a service, an athlete, a player or a team, which is represented pictorially and/or acoustically in the audio and/or visual media content. The product can be originated from a general or specific situation in everyday life or professional life, for example it can be a household item such as a table, an armchair, a drink bottle, a hanging lamp, a book, a shelf, a cupboard, or a piece of clothing, and accordingly an acoustic action object can be an acoustically audible element that suggests a household product, such as the spoken word "table" or an acoustic reproduction of a sound which suggests a table in the corresponding acoustically reproduced part of the action, such as Knocking noises on a table. Thus, an object of action can be a product that can be manufactured and offered on the market and sold economically. Furthermore, an object of action can be a service that is presented in the audio and/or visual media content or that makes a reference to a service, such as the relationship between a holiday scene from the plot of the audio and/or visual media content with a potential holiday trip as a travel product for the viewer and, consequently, with a travel service that is thus associated with the aforementioned scene or sounds, such as the sound of the sea can be associated with the plot of the audio and/or visual media content or it can be a real estate service that can be associated with e.g. a real estate object appearing in the audio and/or visual media content can be associated with a real estate service.

The method steps according to the invention for analysis, namely reading the data set, reading the existing parameter values, verifying the presence of parameter values of the parameters of at least one action object in the audio and/or visual media content, and calculating a result based on the presence of parameter values of the parameters of at least one action object in the audio and/or visual media content, enable an analysis of the data set with regard to existing or detected action objects in the data set and a check of the existing parameter values in order to determine how strongly an action object is specified in the data set. Furthermore, it can be verified whether and which parameters and/or parameter values are present, so that with increasing relevance of the parameters for an action object, the specification of the action object based on the corresponding parameter values becomes more significant.

According to a further aspect of the present invention, the parameter is a placeholder for color, size, manufacturer information, material, purchase address, time information, ingredient, design name, reason for use, identification number, price, action description, location information, duration of visibility, statistical information, time of occurrence, duration of occurrence, number of occurrences, size of occurrence, user information or action object specification, so that the aforementioned parameters can be used as placeholders to specify depending on the action object with the corresponding tailored parameters. Depending on the parameters, suitable parameter values can be used, such as: for the color parameter the parameter values: red, blue, grey, yellow and/or black etc., for the size parameter the parameter values: XS, S, M, L, XL, XXL, XXXL and/or a number, for the material parameter the parameter values: cotton, nylon, wool and/or polyester, for the purchase address parameter the parameter values: an address for online purchase.

According to a further aspect of the present invention, the method additionally comprises the step of calculating the result as a function of a prioritization of at least one parameter.

The parameters can be prioritized so that certain parameters have a higher ranking than the other parameters and are therefore considered more important. Prioritization can preferably be realized using a weighting factor. Preferably, prioritization is carried out depending on a specific product category and/or service category, so that the calculation is carried out with a focus on one or more categories.

According to a further aspect of the present invention, the method additionally comprises the step of including at least one weighting factor for at least one of the parameters for calculating the result. Certain parameters can be assigned a factor in order to give greater or lesser weight to the presence or absence of one or more parameters and/or the presence or absence of a certain combination of parameters.

According to a further aspect of the present invention, the method additionally comprises the step of calculating an overall result based on at least one existing parameter for the data set.

A value can then be derived from the calculation as an overall result for the data set, which has at least one action object with at least one parameter with a corresponding parameter value. According to the invention, it is possible for an audio and/or visual media content to be assigned a specific value, which indicates the quality of the associated data set about the action objects and thus defines the economic value of the audio and/or visual media content.

According to a further aspect of the present invention, the method additionally comprises the step of normalizing the result or the overall result. The advantage of normalization is that a comparison can be made between different data sets and further, the addition of extra factors or mathematical quantities is made easier for further calculation.

According to a further aspect of the present invention, the method additionally comprises the step of additionally comparing at least one parameter of an action object from the data set with at least one product of a product provider and/or service provider in order to calculate a product provider-specific evaluation factor. In this case, a comparison can advantageously be carried out between an action object, which is specified by at least one corresponding parameter with at least one parameter value, and the data of a product provider and/or service provider, so that it is determined how the specified action object corresponds to the products of a product provider or service provider or how strong the degree of correspondence is. Further, according to the invention, the method additionally comprises the step of carrying out the comparison by means of a reference address, in particular a URL, EAN code, QR code, bar code. Preferably, the comparison is carried out by using a further data set which contains data about products and/or services of a provider, so that the comparison is carried out depending on the further data set for the analysis of the data set of parameters of action objects in the audio and/or visual media content according to the invention. Consequently, according to the invention, a result is calculated which indicates the relevance of the action objects presented in the audio and/or visual media content for the provider's further data set with the corresponding products and/or services as a numerical value.

According to a further aspect of the present invention, a computer program product is proposed which can be loaded into the memory of an electronic computer and which has instructions which, when executed by the electronic computer, cause the electronic computer to carry out the steps according to one of the methods described here. The electronic computer can be a personal computer, a smartphone, a server or a notebook.

According to a further aspect of the present invention, a device for analyzing a data set of parameters of action objects in an audio and/or visual media content is proposed.

The device according to the invention has at least an input and an output for receiving and outputting data. Furthermore, the device has at least one storage unit and one processing unit. Furthermore, the device is designed in particular for carrying out the above-mentioned steps in the form of a computer-implemented method, in particular as a computer-implemented method for processing and analyzing a data set of parameters of action objects in an audio and/or visual media content. Furthermore, the device is configured to process the parameters, wherein the parameters of the data set describe the action objects in the audio and/or visual media content with corresponding parameter values and each action object has at least one associated parameter with at least one parameter value, wherein the device is configured to analyze the parameters for existing parameter values in the data set and wherein the device has a readout unit for reading out the data set and is configured to read out the existing parameter values, wherein the device is further configured to verify the presence of parameter values of the parameters of at least one action object in the audio and/or visual media content with a processing unit, wherein the device is further configured to calculate a result based on the presence of parameter values of the parameters of at least one action object in the audio and/or visual media content.

Furthermore, the device according to the invention is designed to process information about the action object, wherein the action object is at least one product, a service, a person, a place, an athlete, a real body, an animated body or a real-animated body.

Furthermore, the device is configured to process the parameter, wherein the parameter is a placeholder for color, size, manufacturer information, material, purchase address, time information, ingredient, design name, reason for use, identification number, price, action description, location information, duration of visibility, statistical information, time of appearance, duration of appearance, number of appearances, size of appearance, user information or action object specification.

Furthermore, the device is designed to use a prioritization specification and to calculate the result depending on the specified prioritization of at least one parameter.

Furthermore, the device is configured to process at least one evaluation factor for at least one of the parameters and to include the evaluation factor in the calculation of the result.

Furthermore, the device is configured to calculate an overall result and to calculate the overall result based on at least one existing or non-existent parameter for the data set.

Furthermore, the device is designed to normalize the result or the overall result.

Furthermore, the device is designed to compare and perform a comparison of at least one parameter of an action object from the data set with at least one product of a product provider and/or service provider and is further designed to calculate a product provider-specific evaluation factor.

Furthermore, the device is designed to carry out the comparison by means of a reference address, in particular a URL, EAN code, QR code, bar code.

Furthermore, according to the invention, a computer program is proposed, wherein the computer program comprises instructions which, when the program is executed by a device, cause the device to operate according to one of the devices described here and to carry out the corresponding steps.

BRIEF DESCRIPTION OF THE DRAWINGS

The invention is described in more detail below with reference to figures.

DETAILED DESCRIPTION OF THE PREFERRED EMBODIMENTS

Figure 1:
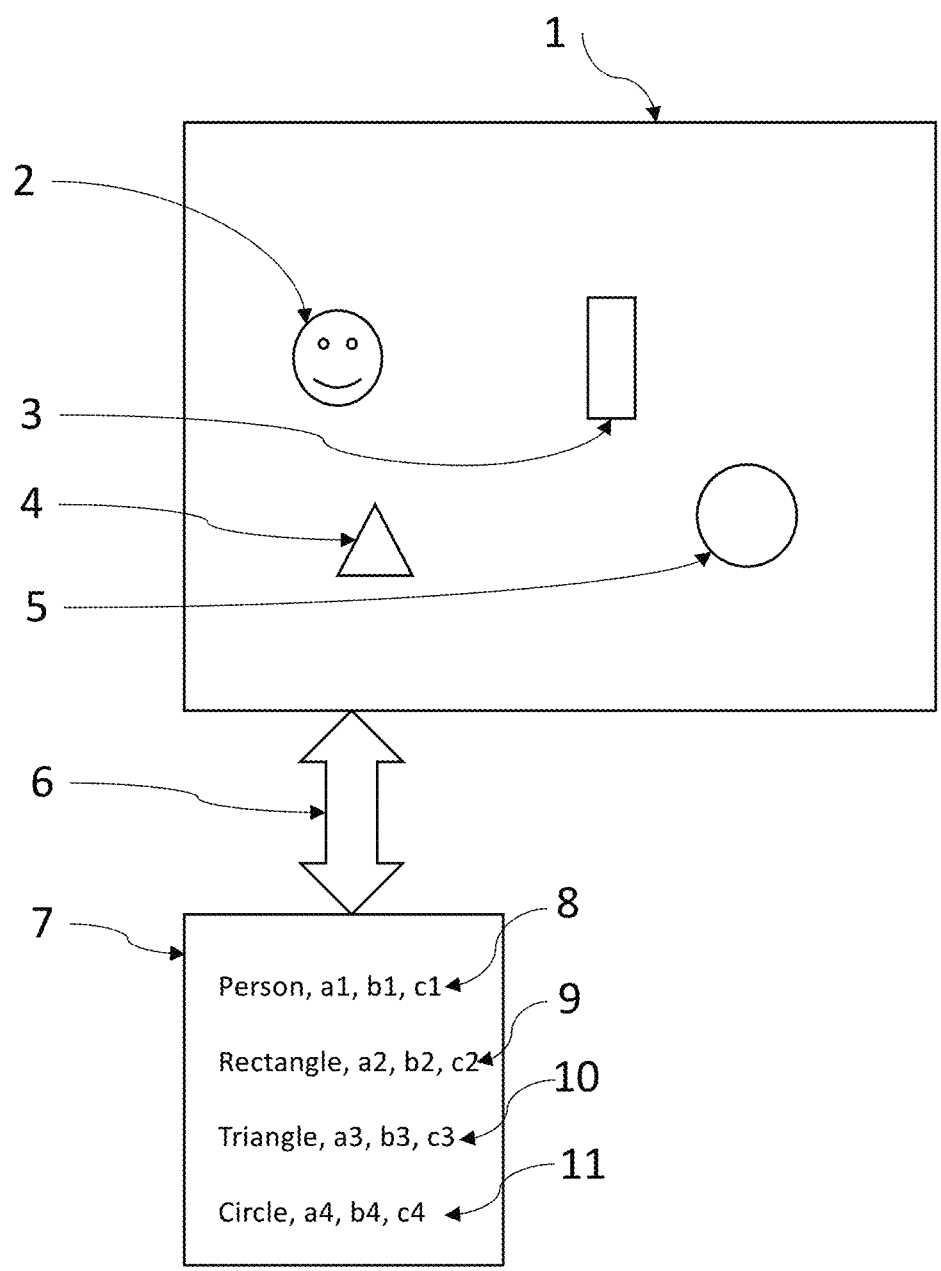
FIG. 1 shows the relationship between action objects, a data set, parameters and parameter values according to the invention.

FIG. 1 shows a visual media content 1 with action objects 2, 3, 4 and 5, which are presented at a certain time and can be perceived visually. Furthermore, FIG. 1 shows a data set 7 with the parameters for the action objects 2, 3, 4 and 5 and the corresponding parameter values 8, 9, 10 and 11. Here, data set 7 contains parameter values 8 for action object 2 with the parameter values person, a1, b1 and c1, parameter values 9 for action object 3 with the parameter values rectangle, a2, b2 and c2, parameter values 10 for action object 4 with the parameter values triangle, a3, b3 and c3 and parameter values 11 for action object 5 with the parameter values circle, a4, b4 and c4. The double arrow 6 symbolizes the correspondence between the visual media content 1 and the associated data set 7, which are related to the visually represented action objects 2, 3, 4 and 5 in the visual media content 1.

The action objects 2, 3, 4 and 5 are used within the framework of an action or scenario is played back as a video using an appropriate device and thus visualized for a viewer. Data set 7 specifies the action objects 2, 3, 4 and 5 with the parameter values 8, 9, 10 and 11, which can each have different characteristic properties of the action objects 2, 3, 4 and 5.

The action object 2 can be e.g. a person who can be seen in the video or visual media content 1, so that the aforementioned person can be specified, for example, with name, age, nationality, date of birth, height, type, eye color, hair color, etc. as possible parameter values.

The action object 3, symbolized as a rectangle, can for example be a beverage container specified with name, color, manufacturer, brand, price, ingredients, taste, usage situation, consumer age, etc. as possible parameter values. The action object 4, symbolized as a triangle, can for example be a piece of clothing, that can be specified with name, color, manufacturer, brand, price, size, material, usage situation, etc. as possible parameter values. The action object 5, symbolized as a circle, can for example be a piece of furniture, that can be specified with name, color, manufacturer, brand, price, dimensions, material, usage situation, etc. as possible parameter values. According to the invention, the action objects 2, 3, 4 and 5 can each have one or more references to one or more action objects 2, 3, 4 and 5, so that one or more parameter values from the parameter values 8, 9, 10 and 11 have at least one parameter value which represents a relationship or a reference to another action object 2, 3, 4 and 5 or to several action objects 2, 3, 4 and 5. Thus, for example, the action object 4, which symbolizes a piece of clothing, can have a parameter value in the parameter values 10 which refers to the action object 2 as a person and represents, for example, that the action object 4 is worn as a piece of clothing by the person as action object 2.

According to the invention and without further specific explanations, FIG. 1 can also be related in an analogous manner to a pure audio media content, so that the action objects 2, 3, 4 and 5 represent audible action objects that can be heard by a listener purely audio-based, which are then further specified based on the above descriptions for the visual media content 1 with the parameter values 8, 9, 10 and 11.

Figure 2:
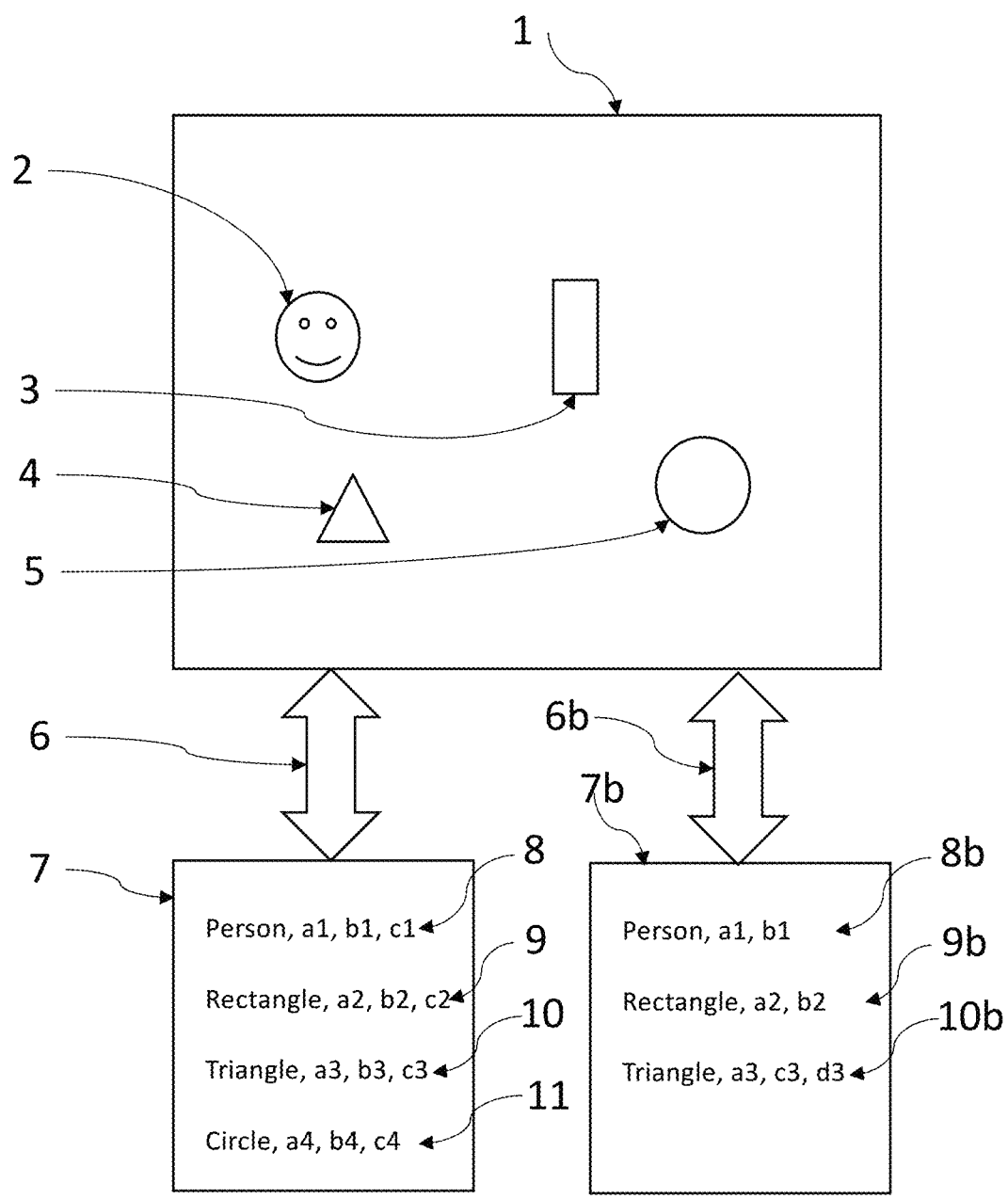
FIG. 2 shows the comparison between two data sets with different quality based on an identical audiovisual media content according to the invention.

FIG. 2 shows a further example according to the invention, wherein a further data set 7b establishes a reference 6b to the action objects 2, 3 and 4 in the visual media content 1. However, data set 7b differs due to missing parameter values of action object 5. In data set 7b, the parameter value c1 for action object 2, the parameter value c2 for action object 3 and the parameter value b3 for action object 4 are missing. Furthermore, data set 7b has a different parameter value d3 for action object 4. The aforementioned differences between dataset 7 and dataset 7b illustrate possible discrepancies in dataset quality and consequently lead to differences in further exploitation of a dataset.

Figure 3:
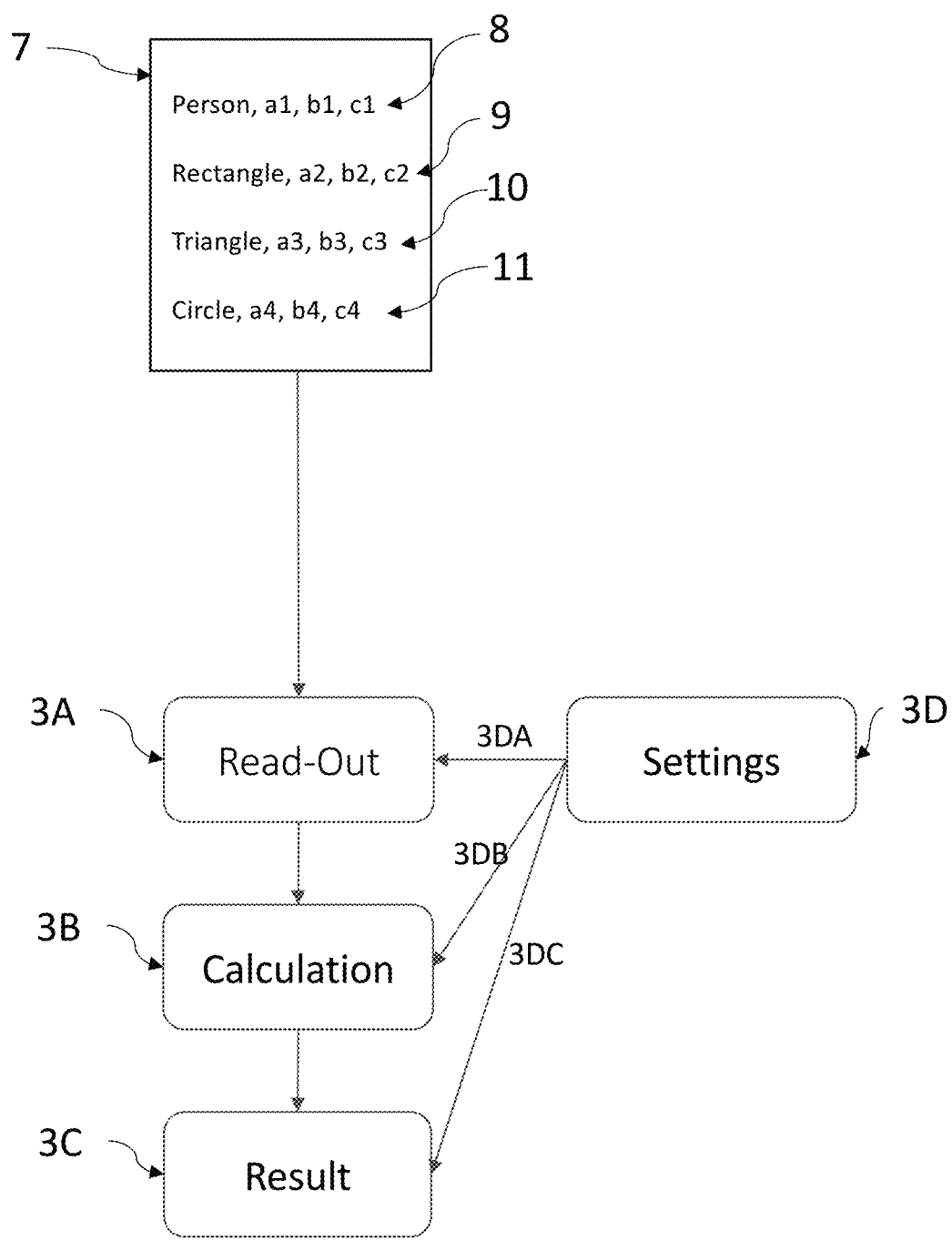
FIG. 3 shows a method according to the invention for analyzing a data set of action objects in an audio and/or visual media content.

FIG. 3 shows a method according to the invention for analyzing the data set 7 with reference to the action objects 2, 3, 4 and 5. FIG. 3 shows a readout 3A of parameters contained in the data set 7 with the parameter values 8, 9, 10 and 11. After reading out 3A, a calculation 3B is carried out with a subsequent output of the result 3C. The reading out 3A, the calculation 3B and the output of the result 3C can be set via settings 3D via the input 3DA for reading 3A, via the input 3DB for the calculation and via the input 3DC for the result 3C. Thus, for example, via 3DA the reading 3A can be limited to certain predefined parameters from the parameter values 8, 9, 10 and 11 and/or carried out according to a predefined priority. Furthermore, the calculation 3B can be carried out with settings 3D via 3DB according to a predefined specification, so that according to the invention the calculation 3B is calculated depending on a prioritization of at least one parameter (person, rectangle, triangle and/or circle) and/or that for the calculation 3B at least one evaluation factor for at least one of the parameters for the calculation 3B of the result is included and/or that the calculation 3B is calculated based on at least one existing or non-existent parameter for the data set 7. After the result 3C is then output after the calculation 3B, whereby the output of the result 3C can be set according to a predefined specification using settings 3D via 3DC, for example by subsequent standardization or conversion into a specified currency or payment currency.

Figure 4:
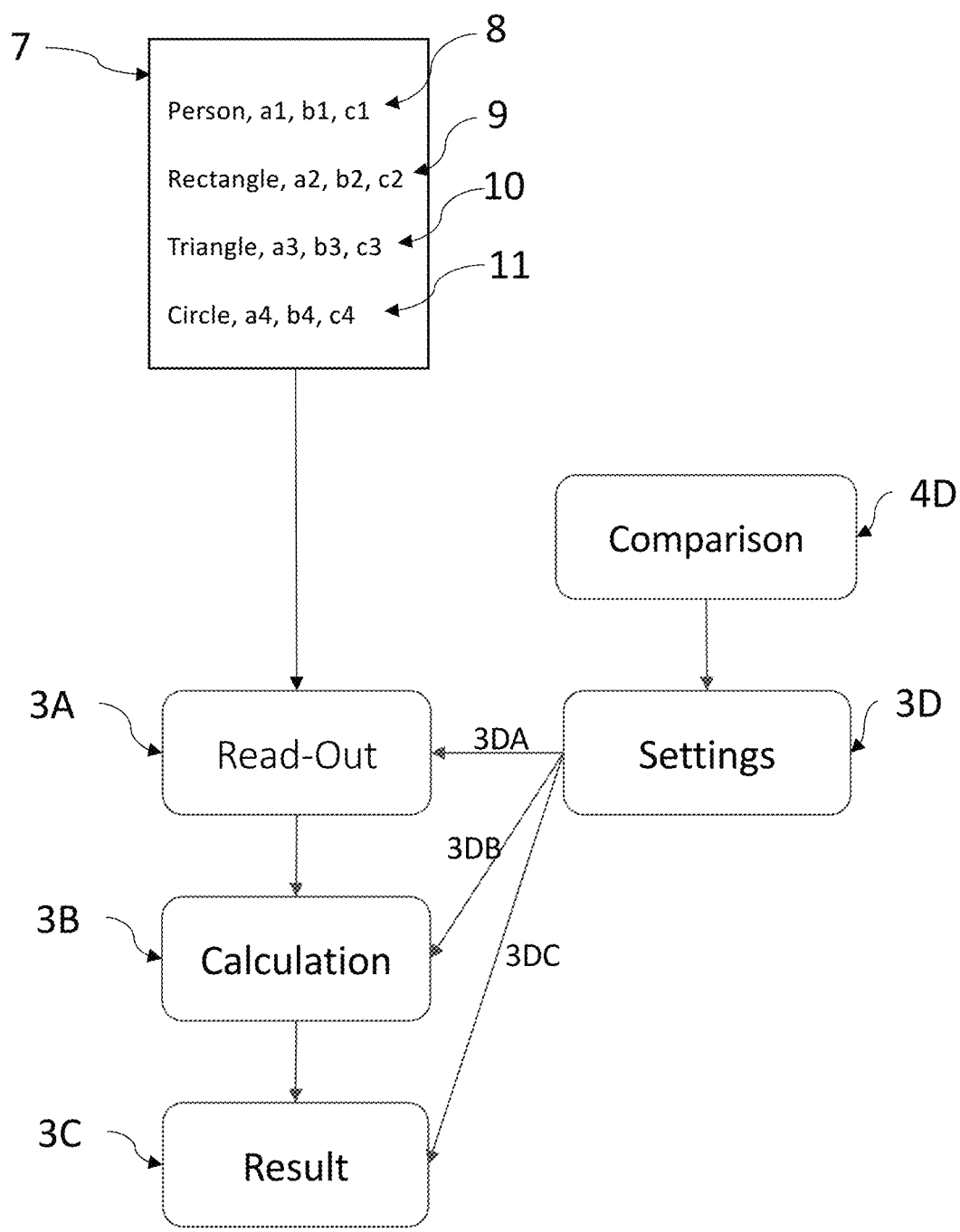
FIG. 4 shows a further method according to the invention for analyzing a data set of action objects in an audio and/or visual media content.

FIG. 4 shows a further method according to the invention for analyzing the data set 7 with reference to the action objects 2, 3, 4 and 5. The above description for FIG. 3 applies here in the same way to FIG. 4, whereby in FIG. 4 there is another instance as comparison 4D. The comparison 4D is used to carry out a comparison with at least one parameter of an action object from another data set with at least one product of a product provider and/or service provider in order to calculate a product provider-specific evaluation factor. The additional data set of the product provider and/or service provider is information about specific objects of action and/or services that can be obtained or purchased by a consumer in the form of products or services from a specific provider. For this purpose, the additional data set contains a list of potential products and/or services of the provider so that an analysis and evaluation of data set 7 can be carried out depending on the additional data set of the provider.

By using the additional data sets of the provider according to the invention, the reading 3A, the calculation 3B and the output of the result 3C are carried out depending on the additional data set of the provider, whereby in most cases it can be assumed that not all products and/or services in the data set 7 and the additional data set of the provider match each other. Consequently, the method according to the invention according to FIG. 4, by using the further data set of the provider, provides a result which provides a value for the relevant action objects 2, 3, 4 and 5 from the audio and/or visual media content with reference to products and/or services of the provider and thus provides a specific value for the provider. As a concrete application example for FIG. 4, visually or acoustically occurring products and/or services that appear in the audio and/or visual media content 1 can be compared with the provider's additional data set in order to verify, based on the result 3C, what economic value the audio and/or visual media content 1 has for the provider. More specifically, it can be stated here that the method according to the invention according to FIG. 4 With the above description, the economic value of action objects recorded in the data set 7 with a product and/or service range of the provider is calculated in order to be able to calculate and specify the economic position value of the audio and/or visual media content 1 with the visualized or acoustically presented products and/or services as action objects 2, 3, 4 and 5 for the provider as result 3C.

Figure 5:
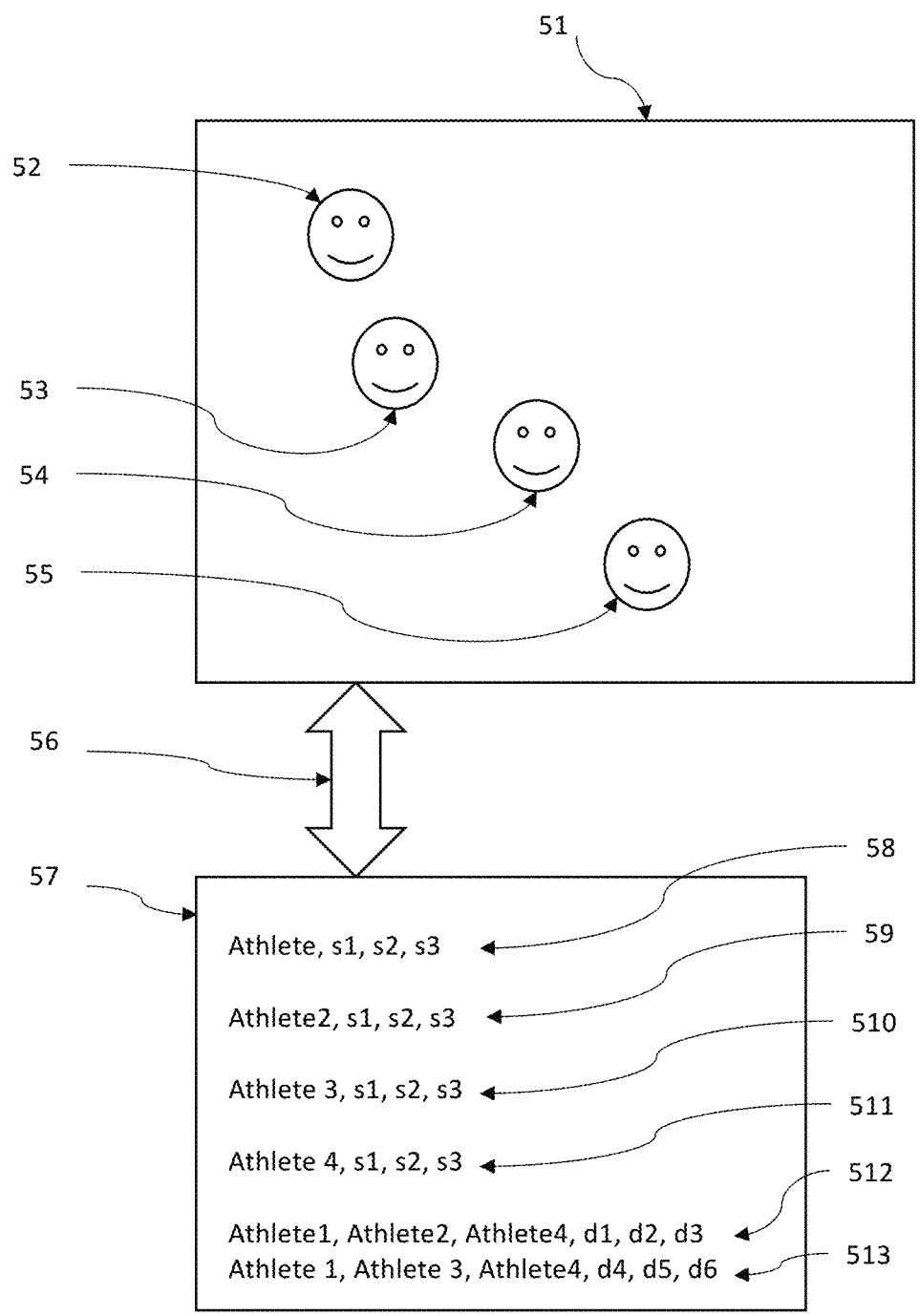
FIG. 5 shows a plurality of athletes or a sports team as an object of action and statistical values as parameters and further use of these data according to the invention.

FIG. 5 shows as audio and/or visual media content 51 a sporting event with a plurality of athletes 52, 53, 54, and 55 as objects of action, wherein according to the invention a data set 57 with corresponding parameter values for athlete 1 with athlete 1, s1, s2, s3, for athlete 2 with athlete 2, s1, s2, s3, for athlete 3 with athlete 3, s1, s2, s3 and for athlete 4 with athlete 4, s1, s2, s3 is present and has a reference 56 to the audio and/or visual media content 51.

Furthermore, as an alternative, the data set 57 can have further parameter values 512 and/or 513, each of which relates to a group and/or subgroup of the action objects 52, 53, 54 and/or 55 and includes further parameter values such as d1, d2, d3, d4, d5 and d6. The parameter values 58, 59, 510, 511, 512, 513 are values related to the athletes 52, 53, 54, 55, which preferably represent a sporting performance of an individual athlete or a group or group of athletes. Specify a subgroup of athletes and/or a calculation for a sporting performance and/or a specific sporting goal, such as in football, for example, this can mean a goal, attack, defense, corner, penalty, substitution, free kick, or the like. The parameter values 58, 59, 510, 511, 512, 513 are in particular athlete-specific data and/or statistically recorded or calculated values. According to the invention and with reference to FIG. 3, the parameter values 58, 59, 510, 511, 512, 513 are read out and, based on a set specification, a calculation, in particular a statically based calculation, is carried out in order to calculate a forecast as a result for a specific time window, which may be in the future in the case of a live event.

What is claimed is:

1. A method for analyzing a data set of parameters of action objects in an audio and/or visual media content, wherein the parameters of the data set describe the action objects in the audio and/or visual media content with corresponding parameter values and each action object has at least one associated parameter with at least one parameter value, wherein the method analyzes the parameters for existing parameter values in the data set and comprises the following steps:
reading the data set by means of a read-out unit;
reading the existing parameter values by means of the read-out unit based on a predefined priority;
reading an additional data set, which includes parameters and parameter values different from those of the data set, of a provider of the at least one action object in the audio and/or visual media content;
verifying by a processor a presence of parameter values of the parameters of at least one action object in the audio and/or visual media content;
calculating by the processor a result based on the presence of parameter values of the parameters of at least one action object in the audio and/or visual media content based on a predefined specification;
comparing the result with the additional data set; and
verifying an economic value of the at least one action object in the audio and/or visual media content based on the comparison.

2. The method according to claim 1, wherein the action object is at least one of a product, a service, a person, a place, or an athlete.

3. The method according to claim 1, wherein the parameter is a placeholder for color, size, manufacturer information, material, purchase address, time information, ingredient, design name, reason for use, identification number, price, action description, location information, duration of visibility, statistical information, time of appearance, duration of appearance, number of appearances, size of appearance, user information or action object specification.

4. The method according to claim 1, further comprising:
calculating by the processor the result as a function of the predefined priority of at least one parameter.

5. The method according to claim 1, further comprising:
including at least one weighting factor for at least one of the parameters for calculating the result by the processor.

6. The method according to claim 1, further comprising:
calculating an overall result based on at least one present or non-present parameter for the data set by the processor.

7. The method according to claim 1, further comprising:
normalizing the result or the overall result by the processor.

8. The method according to claim 1, further comprising:
additionally comparing at least one parameter of an action object from said data set with at least one product of a product provider and/or service provider from the additional data set by said processor in order to calculate a product provider-specific evaluation factor by said processor.

9. The method according to claim 8, further comprising:
carrying out the comparison by means of a reference address, in particular a URL, EAN code, QR code, bar code by the processor.

10. A device for analyzing a data set of parameters of action objects in an audio and/or visual media content, wherein the parameters of the data set describe the action objects in the audio and/or visual media content with corresponding parameter values and each action object has at least one associated parameter with at least one parameter value, wherein the device is configured to analyze the parameters for existing parameter values in the data set, the device comprising:

a readout unit configured for reading out the data set, reading out the existing parameter values based on a predefined priority, and reading out an additional data set, which includes parameters and parameter values different from those of the data set, of a provider of the at least one action object in the audio and/or visual media content; and a processor configured to:
verify the presence of parameter values of the parameters of at least one action object in the audio and/or visual media content;
calculate a result based on the presence of parameter values of the parameters of at least one action object in the audio and/or visual media content based on a predefined specification;
compare the result with the additional data set; and
verify an economic value of the at least one action object in the audio and/or visual media content based on the comparison.

11. The device according to claim 10, wherein the device is configured to process information about the action object, and wherein the action object is at least one product, a service, a person, a place, an athlete, a real body, an animated body or a real-animated body and/or the processor is configured to process the parameter, wherein the parameter is a placeholder for color, size, manufacturer information, material, purchase address, time information, ingredient, design name, reason for use, identification number, price, action description, location information, duration of visibility, statistical information, time of appearance, duration of appearance, number of appearances, size of appearance, user information or action object specification.

12. The device according to claim 10, wherein the device is further configured to calculate the result depending on the predefined priority of at least one parameter and/or the device is further configured to process at least one evaluation factor for at least one of the parameters and to include the evaluation factor for the calculation of the result.

13. The device according to claim 10, wherein the device is further configured to calculate an overall result and is configured to calculate the overall result based on at least one existing or non-existent parameter for the data set and/or the device is further configured to standardize the result or the overall result and/or the device is further configured to compare and carry out the comparison of at least one parameter of an action object from the data set with at least one product of a product provider and/or service provider from the additional data set and is configured to calculate a product provider-specific evaluation factor and/or the device is further configured to carry out the comparison by means of a reference address, in particular a URL, EAN code, QR code, barcode.

14. A computer-readable memory including a computer program comprising instructions which, when executed by a computer to function as the device, cause the device to operate according to claim 10.

15. A computer-readable memory including a computer program product which comprises instructions which, when executed by an electronic computer, cause the electronic computer to carry out the steps of the method according to claim 1.

* * * * *